(12) United States Patent
French et al.

(10) Patent No.: US 9,163,762 B2
(45) Date of Patent: Oct. 20, 2015

(54) SEALED GIMBAL JOINT

(75) Inventors: Hugh N. French, Canandaigua, NY (US); Daniel Munley, Owings, MD (US)

(73) Assignee: Eaton Corporation, Cleveland, OH (US)

( * ) Notice: Subject to any disclaimer, the term of this patent is extended or adjusted under 35 U.S.C. 154(b) by 724 days.

(21) Appl. No.: 13/468,597

(22) Filed: May 10, 2012

(65) Prior Publication Data

US 2013/0300106 A1    Nov. 14, 2013

(51) Int. Cl.
*F16L 27/04* (2006.01)
*F16L 27/08* (2006.01)

(52) U.S. Cl.
CPC .................. *F16L 27/0857* (2013.01)

(58) Field of Classification Search
USPC ........................ 285/265, 223, 235, 264, 274
See application file for complete search history.

(56) References Cited

U.S. PATENT DOCUMENTS

| | | | |
|---|---|---|---|
| 3,915,482 A * | 10/1975 | Fletcher et al. | ............... 285/226 |
| 4,643,463 A | 2/1987 | Halling et al. | |
| 4,645,244 A | 2/1987 | Curtis | |
| 2009/0072494 A1 | 3/2009 | Smith | |

FOREIGN PATENT DOCUMENTS

| | | |
|---|---|---|
| EP | 0095231 A1 | 11/1983 |
| EP | 1484495 A2 | 12/2004 |
| GB | 2083154 A | 3/1982 |
| GB | 2138904 A | 10/1984 |
| GB | 2170567 A | 8/1986 |

OTHER PUBLICATIONS

The International Search Report with Written Opinion, PCT/US2013/040505, Int'l filing date: May 10, 2013.

* cited by examiner

*Primary Examiner* — Aaron Dunwoody

(74) *Attorney, Agent, or Firm* — Benesch, Friedlander, Coplan & Aronoff, LLP

(57) ABSTRACT

A gimbal joint includes a gimbal ring, a first fitting pivotally connected to the gimbal ring such that the first fitting pivots about a first axis, and a second fitting pivotally connected to the gimbal ring such that the second fitting pivots about a second axis substantially orthogonal to the first axis. The gimbal ring further includes a separable sealing element having a cylindrical portion with a first rounded end and a second rounded end. The gimbal ring, the first fitting, the second fitting, and the separable sealing element define a fluid pathway.

18 Claims, 5 Drawing Sheets

SEALED GIMBAL JOINT

FIELD OF INVENTION

The present disclosure relates to a flexible gimbal joint for pipes. More particularly, the present disclosure relates to a flexible gimbal joint having a separable sealing element.

BACKGROUND

Flexible joints for tension piping systems are known in the art. In one known application, such flexible joints are used in aircraft duct systems, such as compressor bleed air and anti-icing lines. Ball and socket joints provide flexibility while transmitting an axial tension load. Gimbal joints having an internal gimbal ring or an external gimbal ring are also known.

SUMMARY OF THE INVENTION

In one embodiment, a flexible gimbal joint includes a first fitting configured to be coupled to an end of a first pipe. The first fitting has an end with a pair of first opposing ridges that define a pair of first opposing recesses. The flexible gimbal joint also includes a second fitting configured to be coupled to an end of a second pipe. The second fitting has an end with a pair of second opposing ridges that define a pair of second opposing recesses. The second fitting is aligned with the first fitting such that the pair of first opposing ridges are received in the pair of second opposing recesses and the pair of second opposing ridges are received in the pair of first opposing recesses. Such alignment defines a portion of a fluid pathway.

The flexible gimbal joint in this embodiment further includes a gimbal ring having first opposing portions pivotally coupled to the pair of first opposing ridges of the first fitting, and second opposing portions pivotally coupled to the pair of second opposing ridges of the second fitting. The flexible gimbal joint also has a separable sealing element disposed about the portion of the fluid pathway, the separable sealing element having a cylindrical portion with a first rounded end and a second rounded end.

In another embodiment, a gimbal joint includes a gimbal ring, a first fitting pivotally connected to the gimbal ring such that the first fitting pivots about a first axis, and a second fitting pivotally connected to the gimbal ring such that the second fitting pivots about a second axis substantially orthogonal to the first axis. The gimbal ring further includes a separable sealing element having a cylindrical portion with a first rounded end and a second rounded end. The gimbal ring, the first fitting, the second fitting, and the separable sealing element define a fluid pathway.

In yet another embodiment, a flexible joint for a fluid pathway includes a first tube portion, a second tube portion, a separable sealing element having a cylindrical portion and at least one rounded end, and a gimbal ring. The gimbal ring is pivotally connected to the first tube portion by a first pair of fasteners. The gimbal ring is pivotally connected to the second tube portion by a second pair of fasteners that are substantially orthogonal to the first pair of fasteners.

BRIEF DESCRIPTION OF THE DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

DETAILED DESCRIPTION

Figure 1:
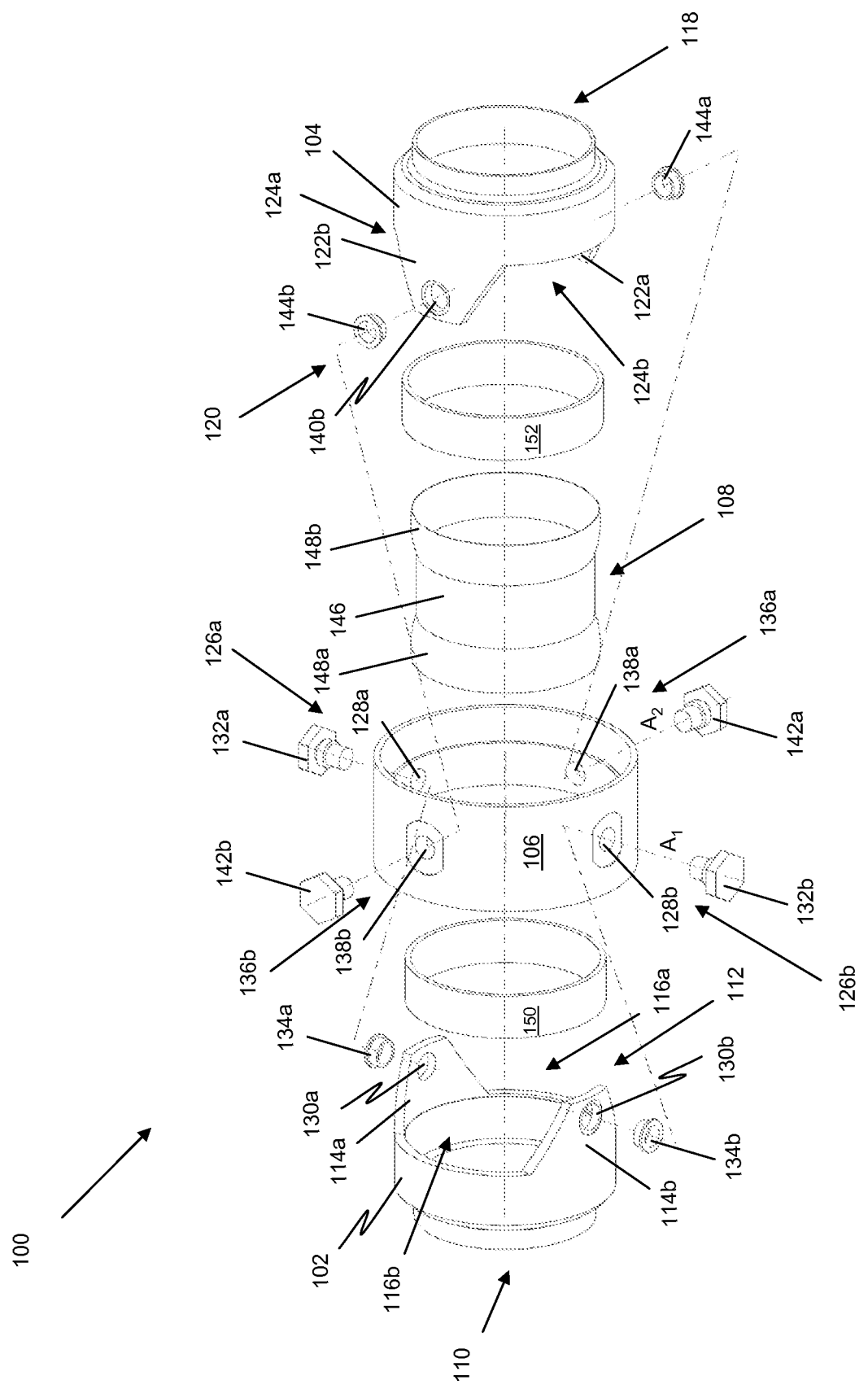
FIG. 1 is an exploded view of one embodiment of a gimbal joint 100.
Figure 2:
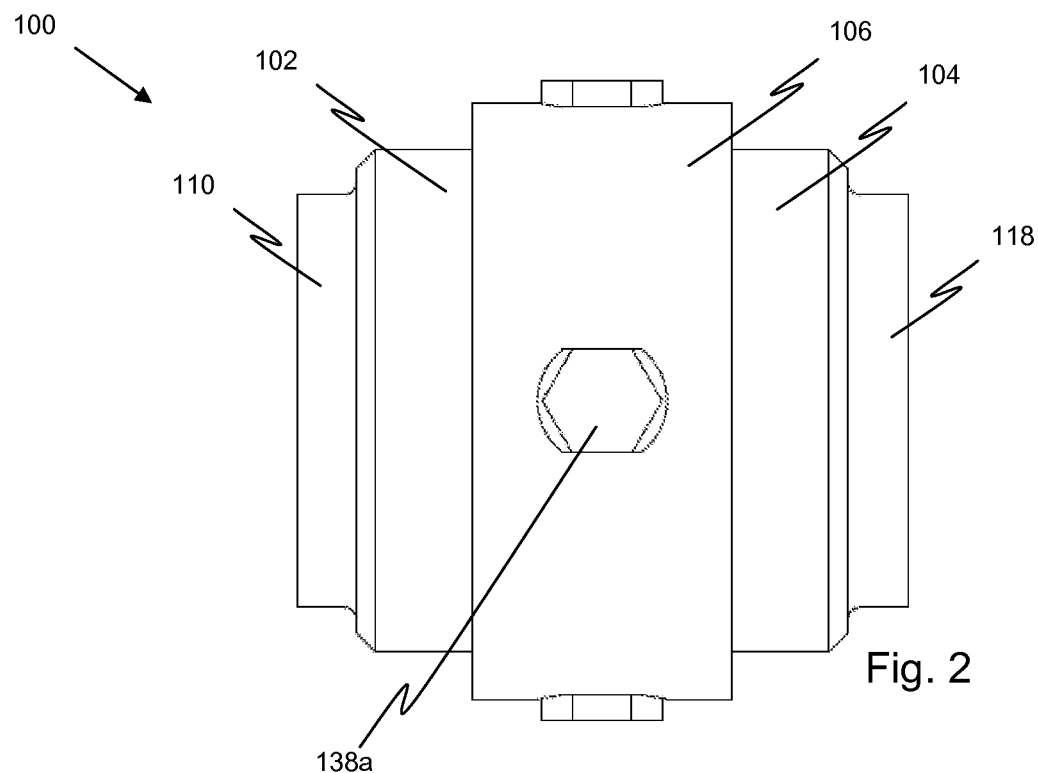
FIG. 2 is a side view of the gimbal joint 100 of FIG. 1.
Figure 3:
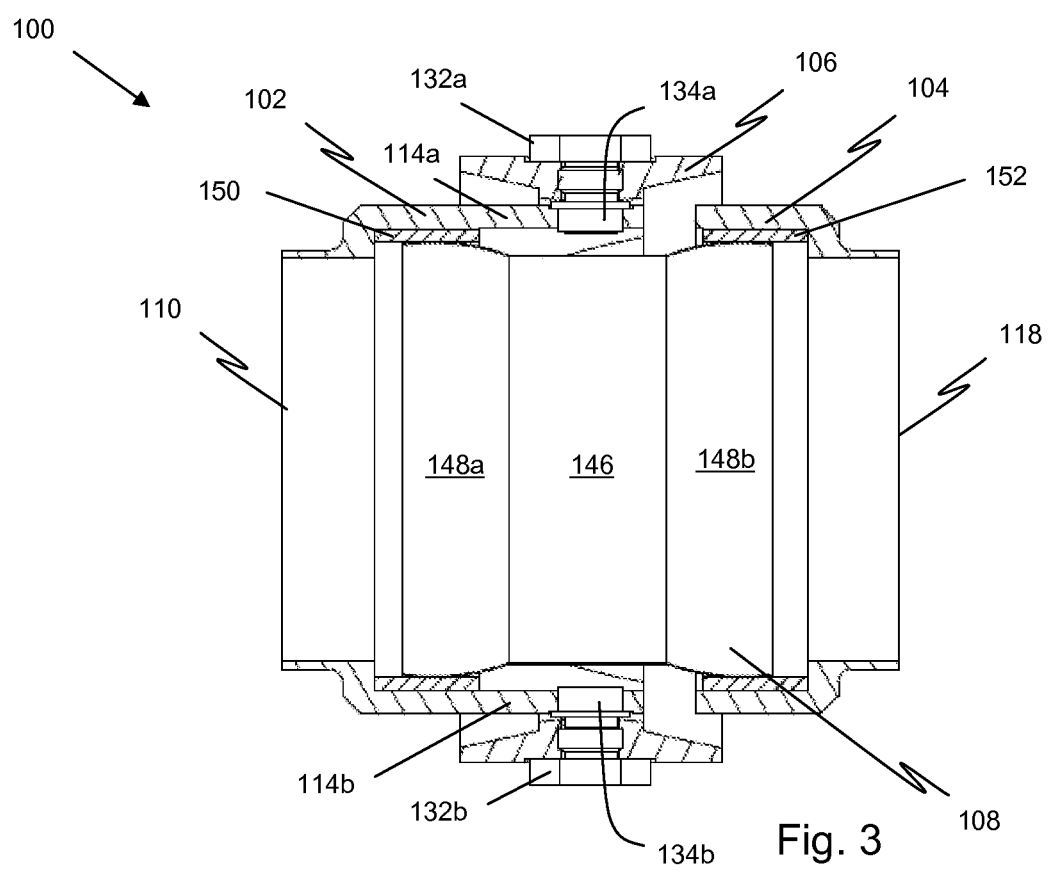
FIG. 3 is a cross section of the gimbal joint 100 of FIG. 1.
Figure 4:
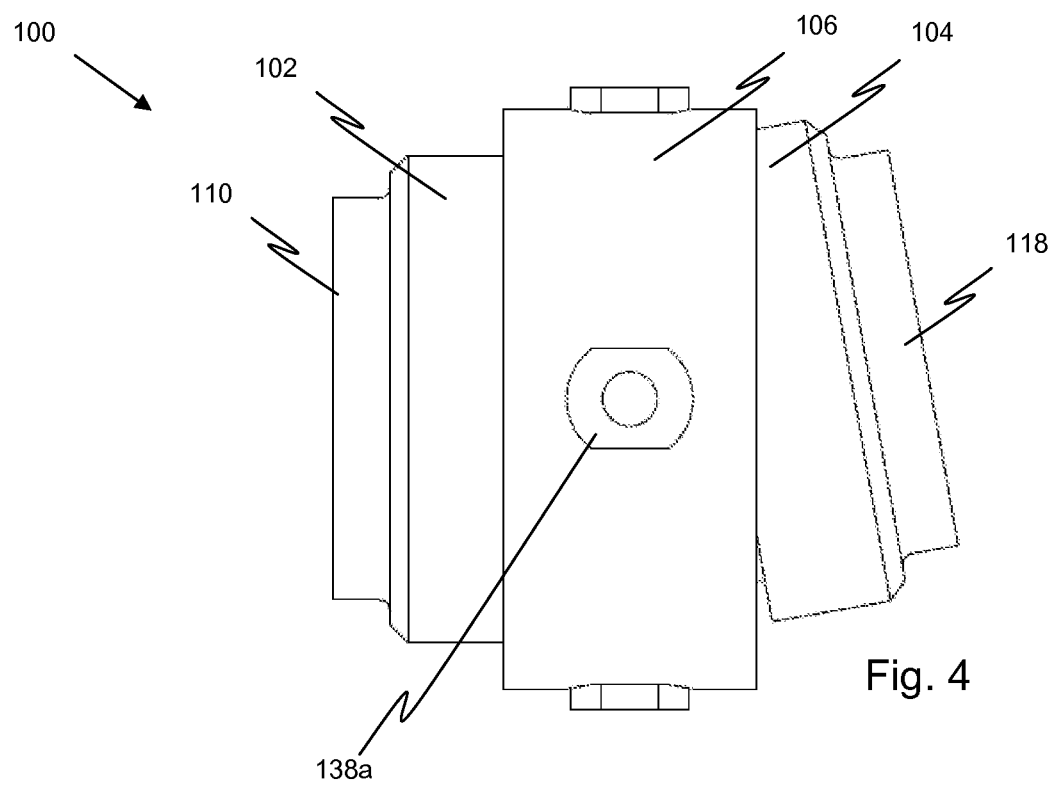
FIG. 4 is a side view of the gimbal joint 100 of FIG. 1 in an angled position.
Figure 5:
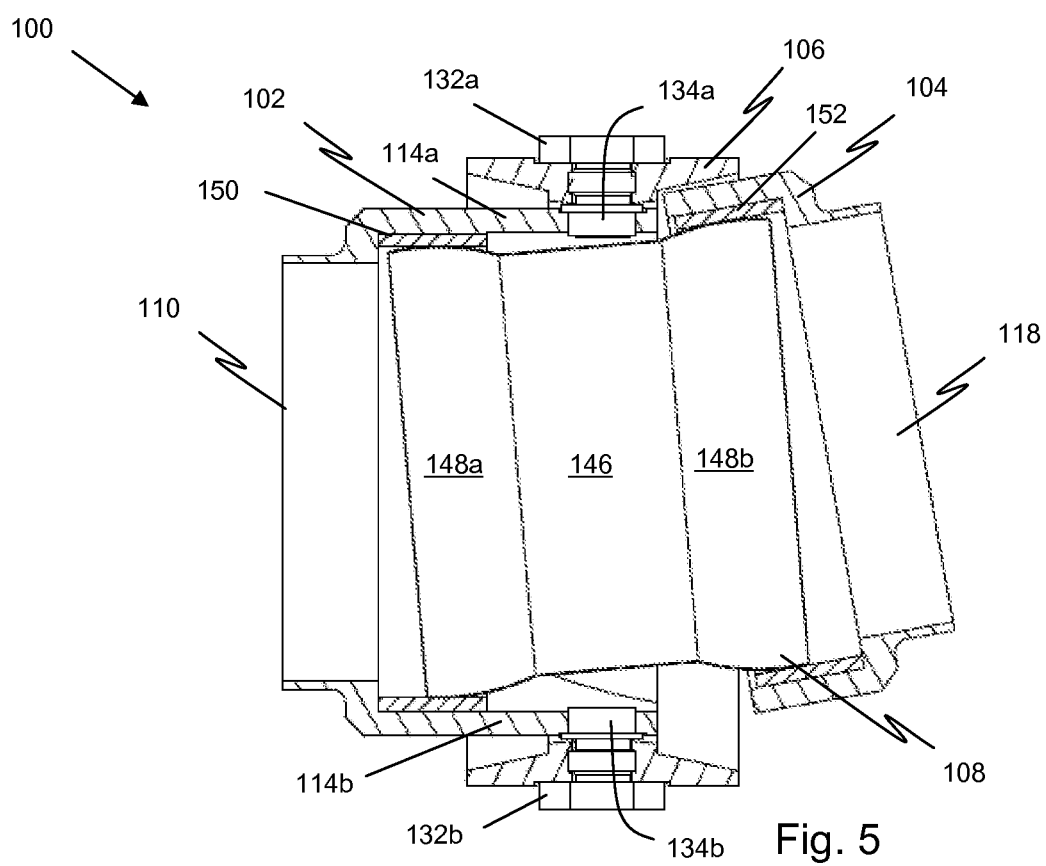
FIG. 5 is a cross section of the gimbal joint 100 of FIG. 1 in an angled position.

FIG. 1 illustrates an exploded view of one embodiment of a gimbal joint 100. FIGS. 2 and 3 illustrate a side view and cross-section, respectively, of the gimbal joint 100. FIGS. 3 and 4 illustrate a side view and cross-section, respectively, of the gimbal joint 100 in an angled position. The gimbal joint 100 is described with reference to all of FIGS. 1-5.

The gimbal joint 100 is a flexible joint configured to connect a first pipe (not shown) to a second pipe (not shown) to define a fluid pathway. The gimbal joint includes a first fitting 102, a second fitting 104, a gimbal ring 106, and a separable sealing element 108.

The first fitting 102 may also be referred to as first tube portion. The first fitting 102 has a first end 110 configured to receive the first pipe, and a second end 112. The second end 112 of the first fitting 102 has a pair of first opposing ridges 114a,b that define a pair of first opposing recesses 116a (the second recess is hidden from view).

The second fitting 104 may also be referred to as second tube portion. The second fitting 104 has a first end 118 configured to receive the second pipe and a second end 120. The second end 120 of the second fitting 104 has a pair of second opposing ridges 122a,b that define a pair of second opposing recesses 124a,b. The first fitting 102 is aligned with the second fitting 104 such that the pair of first opposing ridges 114a,b are received in the pair of second opposing recesses 124a,b and the pair of second opposing ridges 122a,b are received in the pair of first opposing recesses 116a,b. This alignment of the first and second fittings 102, 104 defines a portion of the fluid pathway.

The gimbal ring 106 includes first opposing portions 126a,b pivotally coupled to the pair of first opposing ridges 114a,b of the first fitting 102. In the illustrated embodiment the first opposing portions 126a,b include a first pair of apertures 128a,b that correspond to a second pair of apertures 130a,b in the pair of first opposing ridges 114a,b of the first fitting 102. When the gimbal ring 106 and the first fitting 102 are aligned, the first pair of apertures 128a,b and second pair of apertures 130a,b receive a first pair of fasteners 132a,b and first set of bushings 134a,b. The first pair of fasteners 132a,b and first set of bushings 134a,b define a first axis $A_1$ about which the first fitting 102 pivots. It should be understood, however, that the illustrated pivotal connection is merely exemplary. Alternative pivoting connections may be used, including, without limitation, rivets, swivel connectors, posts extending from the first fitting that are received in apertures in the gimbal ring, posts extending from the gimbal ring that are received in apertures in the first fitting, and other pivotal connectors.

The gimbal ring 106 further includes second opposing portions 136a,b pivotally coupled to the pair of second opposing ridges 122a,b of the second fitting 104. In the illustrated embodiment the second opposing portions 136a,b include a third pair of apertures 138a,b that correspond to a fourth pair of apertures 140a,b in the pair of second opposing ridges 122a,b of the second fitting 104. (Aperture 140a is hidden in this view.) When the gimbal ring 106 and the second fitting 104 are aligned, the third pair of apertures 138a,b and fourth pair of apertures 140a,b receive a second pair of fasteners 142a,b and second set of bushings 144a,b. The second pair of fasteners 142a,b and second set of bushings 144a,b define a second axis $A_2$ about which the second fitting 104 pivots. The second axis $A_2$ is substantially orthogonal to the first axis $A_1$. It should be understood, however, that the illustrated pivotal connection is merely exemplary. Alternative pivoting connections may be used, including, without limitation, rivets, swivel connectors, posts extending from the first fitting that are received in apertures in the gimbal ring, posts extending from the gimbal ring that are received in apertures in the first fitting, and other pivotal connectors.

In the illustrated embodiment, the gimbal ring 106 is external to the first and second fittings 102, 104. In an alternative embodiment (not shown), the gimbal ring is internal to the first and second fittings.

The separable sealing element 108 includes a cylindrical portion 146 with first and second spherical, or rounded ends 148a,b. Because both the first and second ends of the separable sealing element 108 are spherical or rounded, it may be referred to as a "double bubble" separable sealing element. In an alternative embodiment (not shown), a separable sealing element having a single spherical or rounded end (referred to as a "single bubble" separable sealing element) may be employed.

The separable sealing element 108 is disposed about the portion of the fluid pathway defined by the first and second fittings 102, 104. In the illustrated embodiment, the separable sealing element 108 is internal to the first and second fittings 102, 104. The first fitting 102 receives the first rounded end 148a of the separable sealing element 108 and the second fitting 104 receives the second rounded end 148b of the separable sealing element. In this embodiment, the first fitting 102 receives a first insert ring 150 that receives the first rounded end 148a of the separable sealing element 108. Similarly, the second fitting 104 receives a second insert ring 152 that receives the second rounded end 148b of the separable sealing element 108. In an alternative embodiment (not shown), the first and second fittings directly receiving the ends of the separable sealing element.

In the illustrated embodiment, the gimbal ring 106 is substantially centered about the separable sealing element 108. In other words, the gimbal ring is disposed about the cylindrical portion 146 of the separable sealing element 108. In such an embodiment, the rounded ends 148a,b of the separable sealing element 108 angulate through only half of the total angulation of the gimbal joint 100. In an alternative embodiment (not shown), the gimbal ring may be disposed about the first or second rounded end of the separable sealing element.

The separable sealing element 108 is configured to not resist torsional movement. The separable sealing element 108 is configured to distort upon pivoting of the first fitting 102 about the first axis $A_1$, and upon pivoting of the second fitting 104 about the second axis $A_2$.

Figure 6:
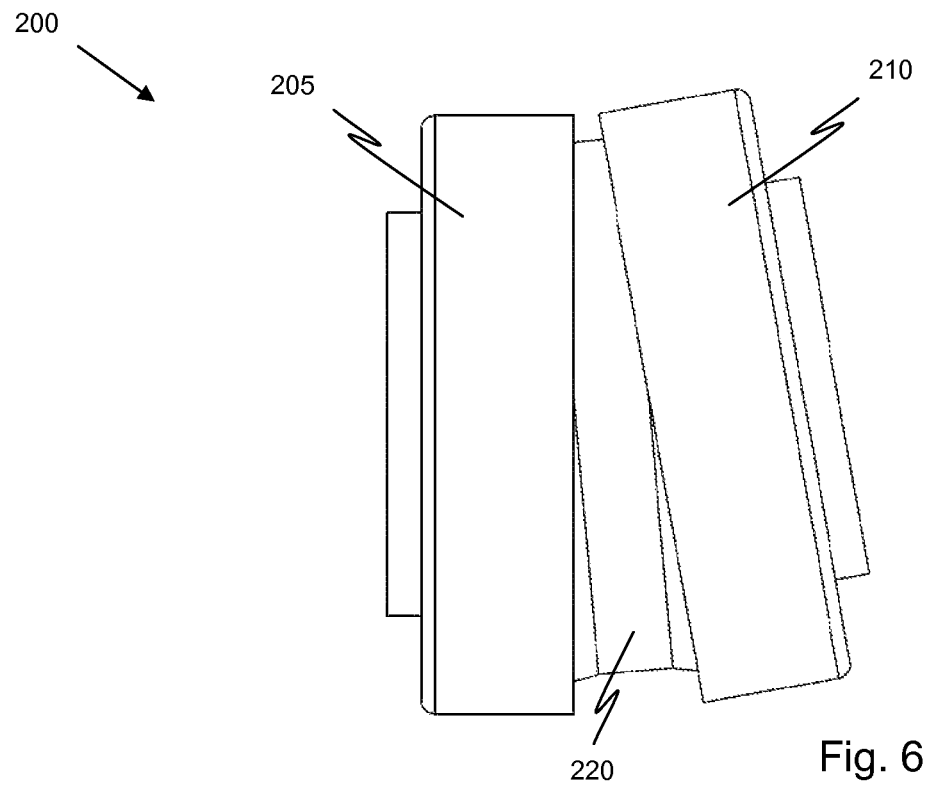
FIG. 6 is a side view of an alternative embodiment of a gimbal joint 200.
Figure 7:
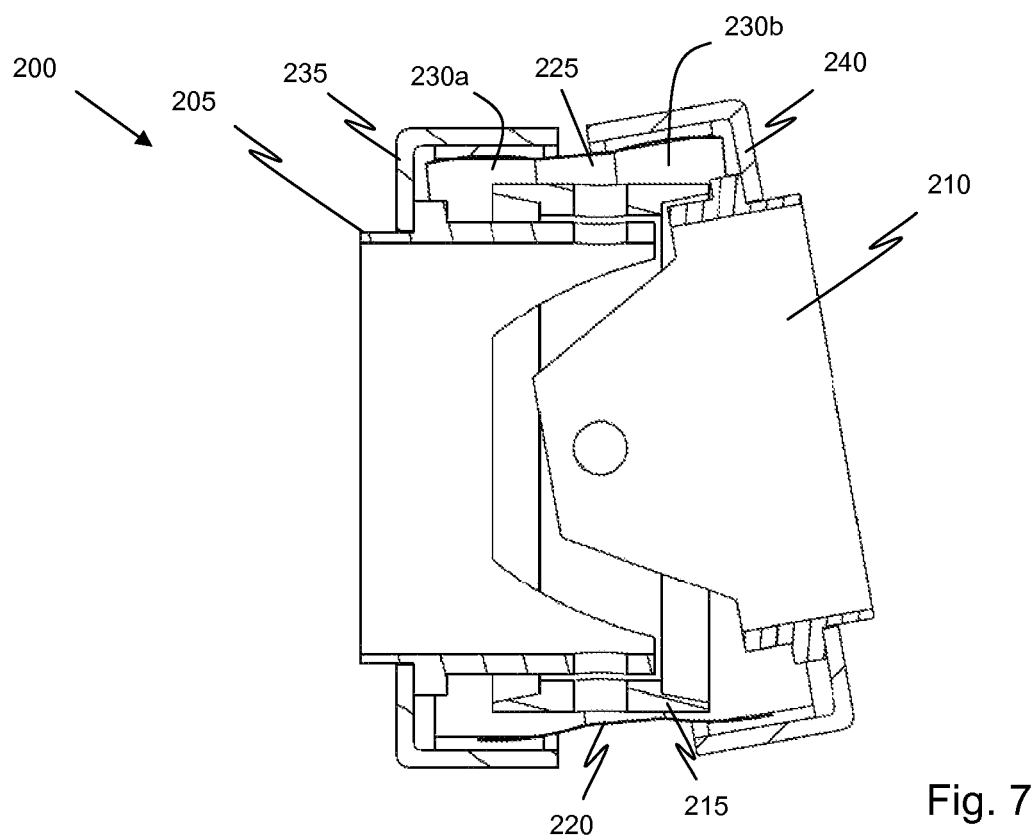
FIG. 7 is a cross section of the gimbal joint 200 of FIG. 6.

FIGS. 6 and 7 illustrate a side view and cross-section, respectively, of an alternative embodiment of a gimbal joint 200. The gimbal joint 200 is described with reference both FIGS. 6 and 7.

The gimbal joint 200 is a flexible joint configured to connect a first pipe (not shown) to a second pipe (not shown) to define a fluid pathway. The gimbal joint 200 includes a first fitting 205, a second fitting 210, a gimbal ring 215, and a separable sealing element 220. The gimbal joint 200 is substantially the same as the gimbal joint 100, except for the differences described herein.

The first fitting 205 may also be referred to as first tube portion, and is pivotally coupled to the gimbal ring 215 about a first axis in the same manner as the first fitting 102 and gimbal ring 106 shown in FIGS. 1-5 and described above. The second fitting 210 may also be referred to as second tube portion, and is pivotally coupled to the gimbal ring 215 about a second axis substantially orthogonal to the first axis, in the same manner as the second fitting 104 and gimbal ring 106 shown in FIGS. 1-5 and described above. Although the gimbal ring 215 is shown as external to the first and second fittings 205, 210, it should be understood that in an alternative embodiment, the gimbal ring may be internal to the first and second fittings.

The separable sealing element 220 is a double bubble separable sealing element having a cylindrical portion 225 with first and second rounded ends 230a,b. In an alternative embodiment (not shown), a single bubble separable sealing element may be employed.

The separable sealing element 220 is disposed about the portion of the fluid pathway defined by the first and second fittings 205, 210. In the illustrated embodiment, the separable sealing element 220 is external to the first and second fittings 205, 210. The first rounded end 230a of the separable sealing element 220 receives the first fitting 205 and the second rounded end 230b of the separable sealing element 220 receives the second fitting 210. The first fitting 205 includes a first flange 235 that receives the first rounded end 230a of the separable sealing element 220. Similarly, the second fitting 210 includes a second flange 240 that receives the second rounded end 230b of the separable sealing element 220. Together, the first flange 235 and second flange 240 retain the separable sealing element about the fluid pathway.

In the illustrated embodiment, the separable sealing element 220 is substantially centered about the gimbal ring 215. In other words, the cylindrical portion 225 of the separable sealing element 220 is disposed about the gimbal ring 215. In such an embodiment, the rounded ends 230a,b of the separable sealing element 108 angulate through only half of the total angulation of the gimbal joint 200. In an alternative embodiment (not shown), the first or second rounded end of the separable sealing element may be disposed about the gimbal ring.

The separable sealing element 220 is configured to not resist torsional movement. The separable sealing element 220 is configured to distort upon pivoting of the first fitting 205 about the first axis, and upon pivoting of the second fitting 210 about the second axis.

Figure 8:
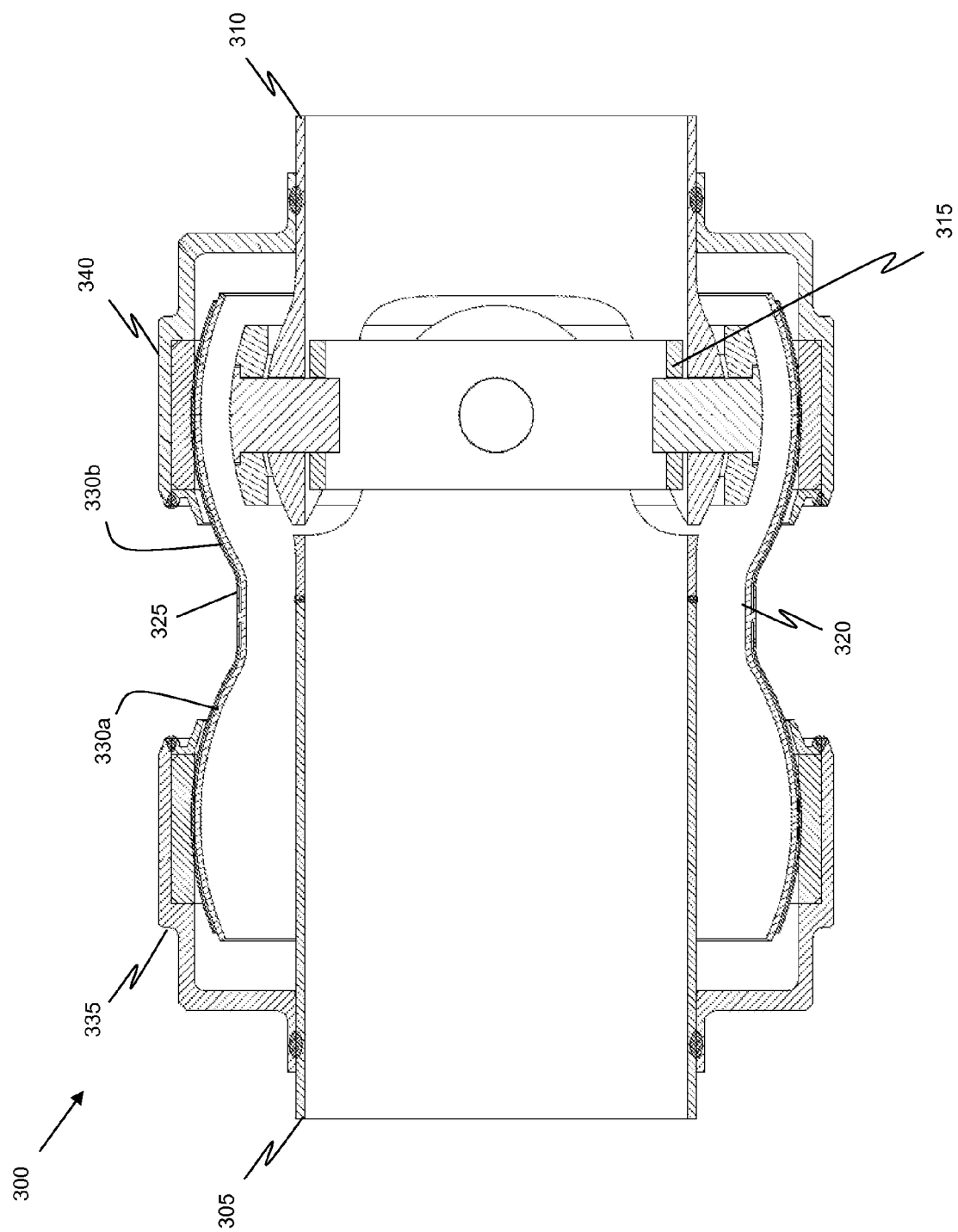
FIG. 8 is a cross-section of an alternative embodiment of a gimbal joint 300.

FIGS. 8 illustrates a cross-section of an alternative embodiment of a gimbal joint 300. The gimbal joint 300 is a flexible joint configured to connect a first pipe (not shown) to a second pipe (not shown) to define a fluid pathway. The gimbal joint 300 includes a first fitting 305, a second fitting 310, a gimbal ring 315, and a separable sealing element 320. The gimbal joint 300 is substantially the same as the gimbal joints 100 and 200, except for the differences described herein.

The first fitting 305 may also be referred to as first tube portion, and is pivotally coupled to the gimbal ring 315 about a first axis in the same manner as the first fitting 102 and gimbal ring 106 shown in FIGS. 1-5 and described above. The second fitting 310 may also be referred to as second tube portion, and is pivotally coupled to the gimbal ring 315 about a second axis substantially orthogonal to the first axis, in the same manner as the second fitting 104 and gimbal ring 106 shown in FIGS. 1-5 and described above. Although the gimbal ring 215 is shown as internal to the first and second fittings 305, 310, it should be understood that in an alternative embodiment, the gimbal ring may be external to the first and second fittings.

The separable sealing element 320 is a double bubble separable sealing element having a cylindrical portion 325 with first and second rounded ends 330a,b. In an alternative embodiment (not shown), a single bubble separable sealing element may be employed.

The separable sealing element 320 is disposed about the portion of the fluid pathway defined by the first and second fittings 305, 310. In the illustrated embodiment, the separable sealing element 320 is external to the first and second fittings 305, 310. The first rounded end 330a of the separable sealing element 320 receives the first fitting 305 and the second rounded end 330b of the separable sealing element 320 receives the second fitting 310. The first fitting 305 includes a first flange 335 that receives the first rounded end 330a of the separable sealing element 320. Similarly, the second fitting 310 includes a second flange 340 that receives the second rounded end 330b of the separable sealing element 320. Together, the first flange 335 and second flange 340 retain the separable sealing element about the fluid pathway.

In the illustrated embodiment, the separable sealing element 320 is aligned with the second rounded end 330b of the gimbal ring 315. In other words, the gimbal ring 315 is off-center with respect to the separable sealing element 320. In an alternative embodiment (not shown), the separable sealing element is aligned with the first rounded end of the gimbal ring.

In all of the disclosed embodiments, the fittings, gimbal ring, and separable sealing element may all be constructed of the same material. In one known embodiment, all of the components are constructed of titanium. Alternatively, one or more of the fittings, gimbal ring, and separable sealing element may be constructed of different material. In one known embodiment, the fittings are constructed of titanium, and the separable sealing element is constructed of a different metal or a polymeric material.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Additionally, to the extent that the terms "on" or "onto" are used in the specification or the claims, it is intended to additionally mean "in," "into," or "near." Furthermore, to the extent the term "connect" is used in the specification or claims, it is intended to mean not only "directly connected to," but also "indirectly connected to" such as connected through another component or components.

While the present disclosure has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the disclosure, in its broader aspects, is not limited to the specific details, the representative apparatus and method, and illustrative examples shown and described. Accordingly, departures may be made from such details without departing from the spirit or scope of the applicant's general inventive concept.

What is claimed is:

1. A flexible gimbal joint for a first pipe and second pipe, the flexible gimbal joint comprising:
    a first fitting configured to be coupled to an end of the first pipe, the first fitting having an end with a pair of first opposing ridges that define a pair of first opposing recesses;
    a second fitting configured to be coupled to an end of the second pipe, the second fitting having an end with a pair of second opposing ridges that define a pair of second opposing recesses, the second fitting being aligned with the first fitting such that the pair of first opposing ridges are received in the pair of second opposing recesses and the pair of second opposing ridges are received in the pair of first opposing recesses, wherein such alignment defines a portion of a fluid pathway;
    a gimbal ring having first opposing portions pivotally coupled to the pair of first opposing ridges of the first fitting, and second opposing portions pivotally coupled to the pair of second opposing ridges of the second fitting; and
    a separable sealing element disposed about the portion of the fluid pathway, the separable sealing element having a cylindrical portion with a first spherical end and a second spherical end, wherein the first fitting receives the first spherical end of the separable sealing element and the second fitting receives the second spherical end of the separable sealing element.

2. The flexible gimbal joint of claim 1, wherein the separable sealing element is configured to not resist torsional movement.

3. The flexible gimbal joint of claim 1, wherein the gimbal ring is substantially centered about the separable sealing element.

4. The flexible gimbal joint of claim 1, wherein the gimbal ring is external to the first fitting and the second fitting.

5. The flexible gimbal joint of claim 4, wherein the first fitting includes a first flange that receives the first spherical end of the separable sealing element and the second fitting includes a second flange that receives the second spherical end of the separable sealing element.

6. The flexible gimbal joint of claim 1, wherein the first fitting and the second fitting are disposed about the separable sealing element.

7. The flexible gimbal joint of claim 1, wherein the first fitting and the second fitting are constructed of a first material, and the separable sealing element is constructed of a second material different from the first material.

8. A gimbal joint comprising:
    a gimbal ring;
    a first fitting pivotally connected to the gimbal ring such that the first fitting pivots about a first axis;

a second fitting pivotally connected to the gimbal ring such that the second fitting pivots about a second axis substantially orthogonal to the first axis; and a separable sealing element having a cylindrical portion with a first rounded end and a second rounded end, wherein the first spherical end of the separable sealing element receives an end of the first fitting and the second spherical end of the separable sealing element receives an end of the second fitting, and wherein the gimbal ring, the first fitting, the second fitting, and the separable sealing element define a fluid pathway.

9. The gimbal joint of claim 8, wherein the gimbal ring is substantially centered about the separable sealing element.

10. The flexible gimbal joint of claim 9, wherein the gimbal ring is disposed about the first fitting and the second fitting.

11. The gimbal joint of claim 8, wherein the gimbal ring is disposed about the first fitting and the second fitting.

12. The gimbal joint of claim 11, wherein the separable sealing element is disposed about the gimbal ring.

13. The gimbal joint of claim 8, wherein the separable sealing element is configured to distort upon pivoting of the first fitting.

14. The gimbal joint of claim 8, wherein the separable sealing element is configured to distort upon pivoting of the second fitting.

15. A flexible joint for a fluid pathway, the flexible joint comprising:
 a first tube portion;
 a second tube portion;
 a separable sealing element having a cylindrical portion and at least one rounded end; and
 a gimbal ring,
  wherein the gimbal ring is pivotally connected to the first tube portion by a first pair of fasteners, and
  wherein the gimbal ring is pivotally connected to the second tube portion by a second pair of fasteners that are substantially orthogonal to the first pair of fasteners,
  wherein the separable sealing element is external to the first and second tube portions.

16. The flexible joint of claim 15, wherein the first and second tube portions are constructed of a first material, and the separable sealing element is constructed of a second material different from the first material.

17. The flexible joint of claim 15, wherein the separable sealing element includes a first rounded end and a second rounded end.

18. The flexible joint of claim 15, wherein the gimbal ring is external to the first and second tube portions.

* * * * *